June 22, 1937.  J. PAUL  2,084,701
AMUSEMENT DEVICE
Filed Aug. 15, 1936  2 Sheets-Sheet 1
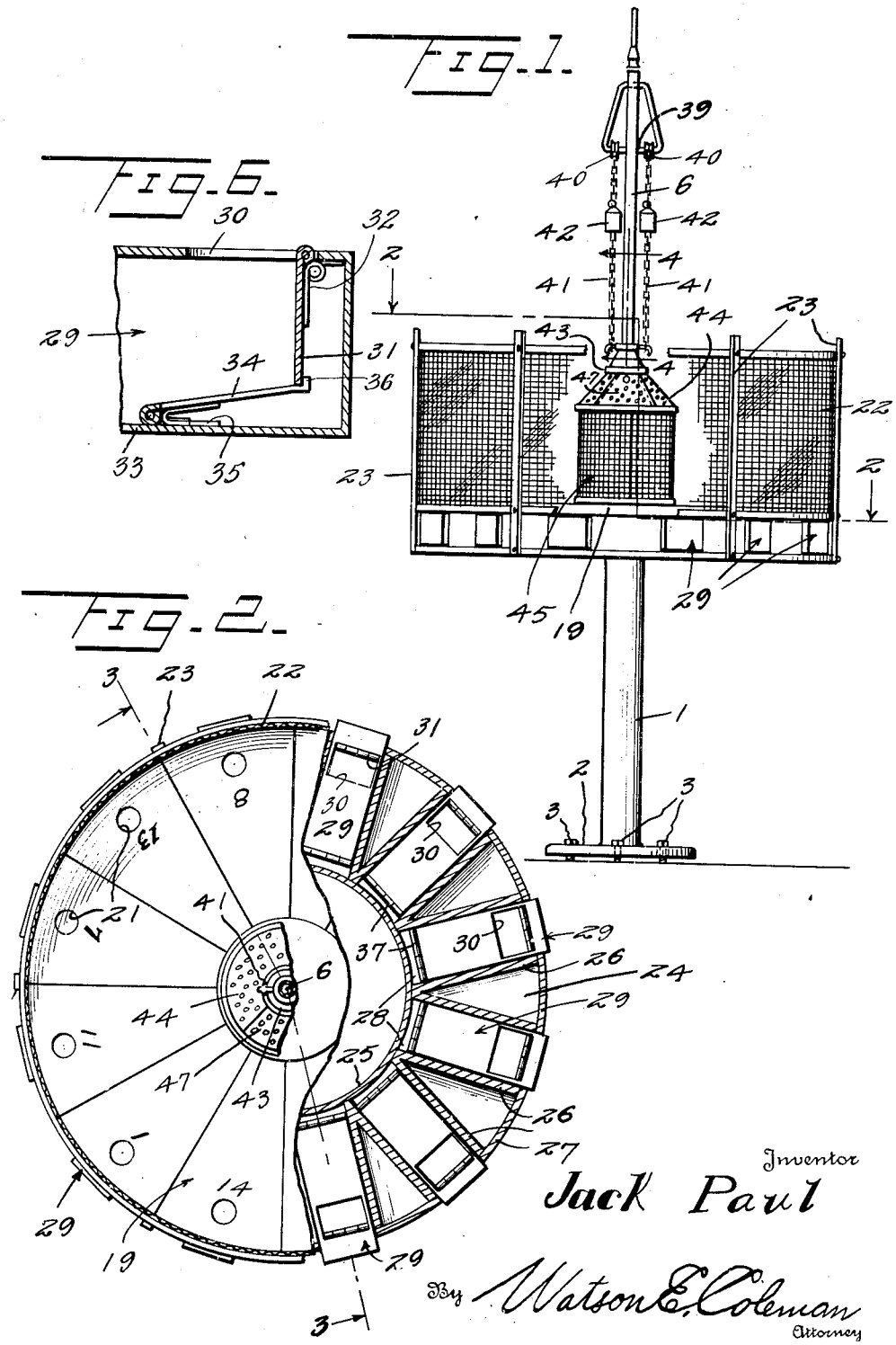

June 22, 1937.  J. PAUL  2,084,701
AMUSEMENT DEVICE
Filed Aug. 15, 1936  2 Sheets-Sheet 2
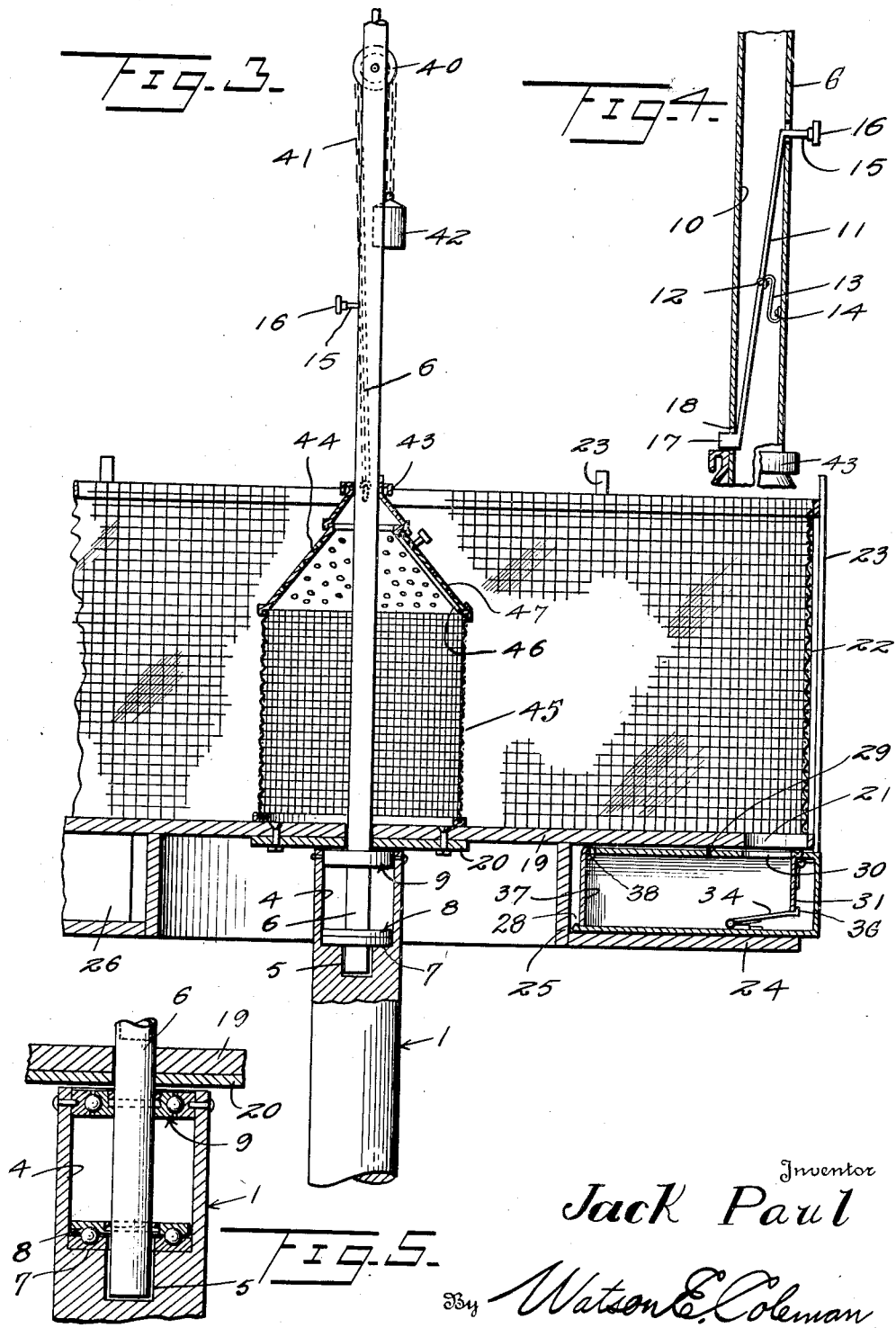
Inventor
Jack Paul
By Watson E. Coleman
Attorney Patented June 22, 1937

2,084,701

UNITED STATES PATENT OFFICE 2,084,701

AMUSEMENT DEVICE

Jack Paul, Philo, Ohio

Application August 15, 1936, Serial No. 96,287

9 Claims. (Cl. 273—139)

This invention relates to an amusement device or game and is directed particularly to a game of chance in connection with which bets may be made.

The primary object of the present invention is to provide a novel amusement device in the form of a game of chance and which makes use of the natural instinct of certain animals to seek cover by making for and entering the nearest opening, hole or other safety affording means, the device involving the use of such an animal with a plurality of designated openings into any one of which it may run.

Another object of the invention is to provide a game device which employs a movable cage within a larger cage or enclosed area, and in which the movable cage houses an animal such as a mouse and the outer cage has a floor provided with a plurality of openings which are numbered or otherwise positively identified and into one of which the animal will run when released from its cage.

Another object of the present invention is to provide in a game of the above described character a novel means for housing a live animal and releasing the same during the playing of the game.

A still further object of the invention is to provide a novel animal cage which is vertically movable within a play area and in which novel means is provided for effecting the automatic raising of the cage to permit the escape of the animal from the open bottom thereof.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of the device embodying the present invention, a portion of the same being broken away.

Fig. 2 is a sectional view taken upon the line 2—2 of Fig. 1.

Fig. 3 is a vertical sectional view upon an enlarged scale taken on the line 3—3 of Fig. 2.

Fig. 4 is an enlarged sectional view taken longitudinally of the portion of the mast immediately above the animal cage.

Fig. 5 is a vertical sectional view through the bearings and adjacent structure at the lower end of the mast.

Fig. 6 is a view upon an enlarged scale of the outer end of a trap box.

Referring now more particularly to the drawings, the numeral 1 generally designates a supporting standard for the device embodying the present invention, this standard being mounted upon a base 2 which may be provided with a plurality of screws 3 which are threaded therethru adjacent the periphery and which constitute vertically adjustable feet whereby the structure supported upon the standard may be leveled.

The upper end of the standard is provided with a longitudinally extending socket 4, in the bottom of which is a reduced extension 5 into which the lower end of a mast 6 is positioned. By the formation of the reduced extended portion 5 in the socket 4 there is provided the shoulder 7 upon which one of the two race members of a ball thrust bearing unit, indicated generally by the numeral 8, is mounted. The other member may be secured to the lower end of the mast 6 and the balls interposed between the two race members maintain the same separated and support the mast, the lower end of the latter merely being in frictional contact with the wall of the portion 5. At the upper end of the socket 4 a second anti-friction bearing unit, which is indicated by the numeral 9, is disposed in surrounding relation with the mast, and this unit constitutes a self-centering bearing. When the device is in operation the socket 4 will be filled with suitable lubricant, such for example, as castor oil.

The upper portion of the mast 6 is hollow or tubular, as indicated at 10, to form a casing for a latch bar 11 which is oscillatably mounted at the point 12 upon one end of a spring support 13 which has its other end fixed to the wall of the mast at the point 14. This latch bar extends longitudinally of the chamber 10 and obliquely, as shown, so that its free end which is turned laterally as indicated at 15, may extend through a suitable opening in the wall of the mast, and this laterally turned end carries a button 16 by means of which the bar may be oscillated. The other or lower end of the bar is formed to provide a latch finger 17 which extends through the opening 18 at the opposite side of the mast and at a predetermined distance above a floor structure which is indicated generally by the numeral 19.

The floor structure 19 is illustrated as being in the form of a relatively large disc through the central part of which the mast 6 passes, and the underside of this disc has a plate 20 secured to the center thereof and a locking connection is established between the plate and the mast so that the mast, plate, and disc forming the said floor, will all rotate as a unit. While it is preferred that the floor 19 be circular or disc-like in outline, it will, of course, be obvious that it may be rectangular or any other desired outline.

The top surface of the floor 19 is divided in any suitable manner, as by painting or the like, into a fixed number of areas, preferably fifteen, and in close proximity to the periphery of the floor is a series of apertures 21, each of which lies in one of the said areas. In addition to these areas being distinctively colored, they may be additionally suitably designated as by a number or letter or in any other desired manner.

Surrounding and extending upwardly from the periphery of the floor 19 is a transparent wall structure 22, which is preferably made of the material known in commerce as plastacelo or flexible glass. This material is in the form of a woven wire screen having a transparent cellulose coating. Suitable bars 23 are secured in vertical position about the periphery of the floor 19 for maintaining the transparent wall 22 rigidly upright. It will thus be apparent that the structure thus far described constitutes an enclosure which is rotatably mounted upon the supporting standard 1. This enclosure preferably has its top open.

Disposed beneath and in concentric relation with the floor 19 is an annular sub-floor 24. The standards 23 are extended downwardly across the outer edge of the sub-floor 24 and secured thereto, while at the inner edge of the latter a suitable wall 25 may be placed for connecting this edge with the overlying main floor 19. Thus the sub-floor is maintained in spaced relation with the main floor 19 and in addition there are disposed between these floors pairs of outwardly diverging walls 26 which are connected at their outer ends by the curved walls 27 and these pairs of walls are in spaced relation throughout the extent of the sub-floor 24 so as to form a series of outwardly opening recesses 28, each of which is disposed beneath an opening 21 of the floor 19. While there has been shown the walls 26 and 27 to make up the triangular partitioning units between the chambers 28 it will, of course be obvious that solid bodies may be disposed in these positions for forming the spaced radially directed chambers 28.

Slidable into each of the outwardly opening chambers 28 is a trap box 29, which has the opening 30 in its top wall which is located beneath the opening 21 when the box is in a chamber. This opening 30 is normally uncovered but is adapted to be closed by the vertical oscillating door 31 which is hingedly attached to the top of the box and which is normally urged in closed position by a spring 32. The bottom 33 of the box has pivotally attached thereto directly beneath the opening 30 the oscillating plate 34 which has a spring 35 normally urging it to swing upwardly. At the free edge of this plate 34 is a stop 36 and this stop operates to prevent the bar 31 being swung beyond the free edge of the plate 34 when the door is secured in open position. The door 31 is held in open position by the frictional engagement of the top surface of the plate 34 against its lower edge. It will thus be apparent that when an animal such as a mouse, passes through the opening 21 and the opening 30 and alights upon the plate 34, it will depress the plate sufficiently to allow the door 31 to be released and to swing to closed position. The inner end wall of the box 29 is indicated by the numeral 37 and is in the form of a door which is pivotally attached as at 38, to the top wall of the box and provides means by which the trapped animal may be released.

Adjacent the top of the mast 6 are two laterally extending arms 39 each of which carries a pulley 40. Passing over each of the pulleys is a chain 41 which has attached to one end a weight 42 while the other end is attached to a collar 43 which surrounds the mast and is slidable thereon. This collar is in the form of a truncated cone and has attached to its lower edge the cone-like top 44 of a cage 45. The bottom of the cage is open and normally rests upon the top of the floor 19 and the top 44 is provided with an opening 46 which is covered by the door 47 which may be hingedly attached to the top or engaged at its top and bottom edges in the manner shown so that it may be slid to open and closed positions.

In the operation of the present amusement device, the same may be disposed, if desired, in an enclosed area so that those persons playing the game will be kept back a certain distance from the device herein described and in addition this closed area may be in the form of a counter of circular or polygonal outline and provided with numbers or other means for establishing a required relation between a number of player stations at the counter and the number of designated areas upon the top of the floor 19. Thus if the players wish to make bets regarding the particular aperture 21 into which the animal will run when released from the cage 45, they may do so by standing before one of the stations upon the encircling counter or otherwise designating the station corresponding with the opening in the flooor 19 into which they are betting that the animal will run. When the players have made their selections of the openings 21 into which they believe the animal will run when released from the cage 45, the operator of the device presses the button 16 so as to disengage the latch finger 17 from the top of the sliding collar 43, thus allowing the weights 42 to lift the cage from the floor 19. Prior to the releasing of the cage the entire structure will be caused to revolve and then when the cage is released and the animal is released, it will seek cover by entering one of the numerous holes 21, and of course, the player having selected the hole in which the animal passes will win any prize which may be put up.

As soon as the animal enters the hole 21 he will drop, as previously described, upon the plate 34 and trap himself in the box 29. The box may then be removed from its chamber 28 and after drawing the cage 45 down to its former position where it will be secured by the latch 17, the operator will open the door 47 and allow the animal to escape from the box by swinging the end wall 37 thereof inwardly, having previously placed this end of the box over the opening 46 of the cage.

From the foregoing it will be apparent that the amusement device herein described has for a particularly novel feature the use of an animal of the type which will normally seek cover by entering the nearest opening, such as a mouse, chipmunk, ground mole, or the like. In addition the device may be played as a game of chance, if desired, and it will be obvious to all playing that no cheating can take place in view of the fact that the possibility of winning depends entirely upon the hole selected by the animal for cover, and the operator of the device has no control whatever over this selection.

Having thus described my invention, what I claim, is:

1. A game structure comprising a floor, enclosure forming means extending upwardly from the floor, said floor having a plurality of apertures therethrough within and adjacent to the enclosure forming means, a plurality of compartments each removably mounted beneath the floor and each having an entrance opening coinciding with a floor aperture, an animal cage within the enclosed area and resting upon the floor, said cage having an open bottom, and means for effecting the automatic raising of the cage to permit the escape of an imprisoned animal into the enclosed area.

2. A game structure comprising a floor, a transparent wall structure extending upwardly from the floor and forming an enclosed area thereover, said floor having a plurality of apertures formed therethrough in an annular series and in proximity to said upwardly extending structure, means forming a plurality of chambers beneath the floor, each of said apertures opening into a chamber, an animal entrapping box removably positioned in each chamber and having a top opening coinciding with the adjacent floor opening, an animal imprisoning cage within the enclosed area, and means for releasing an animal from the cage into the area.

3. A game structure comprising a floor, a transparent wall structure extending upwardly from the floor and forming an enclosed area thereover, said floor having a plurality of apertures formed therethrough in an annular series and in proximity to said upwardly extending structure, means forming a plurality of chambers beneath the floor, each of said apertures opening into a chamber, an animal entrapping box removably positioned in each chamber and having a top opening coinciding with the adjacent floor opening, a mast extending upwardly from the central part of the enclosed area, an animal imprisoning cage having said mast extending centrally therethrough, said cage having its lower side open and normally resting upon the floor, and means for raising said cage on the mast to permit an animal to escape from the cage.

4. A game structure of the character described comprising a vertical supporting standard, a mast extending vertically from the upper end of said standard, said mast having its lower end rotatably mounted in the said standard end, a floor structure having said mast extending through the central part thereof and secured to the mast to rotate therewith, an upright fence-like structure carried by the floor and forming an enclosed area therewith about the mast, means forming an annular series of compartments beneath the floor and adjacent the periphery thereof, said floor having an annular series of openings therethrough, each of said openings communicating with a compartment, an animal imprisoning cage within the enclosed area and mounted for vertical sliding movement on said mast, latch means normally retaining said cage in position within the area, weight elements connected with said cage and adapted to raise the same upon its release by the latch element, said cage having an open under side, and a plurality of animal entrapping boxes each having a top entrance opening and each adapted for insertion into a compartment where said top opening coincides with an adjacent floor aperture.

5. In a game of chance device of the character described, an animal trap box having a top wall provided with an animal entrance opening, an inwardly swinging door carried by said top wall and adapted to close said opening, a plate member oscillatably supported in the lower part of the box beneath said opening, resilient means normally urging said plate member upwardly, and resilient means normally urging said door to closed position, said door being maintained in open position by the frictional contact of an edge thereof with the top surface of said spring pressed plate and released for closing by the weight of an animal dropping through said opening onto the plate.

6. A game structure of the character described, comprising a floor, enclosure forming means upon the floor, a plurality of animal receiving compartments removably maintained adjacent the floor, means facilitating the escape of an animal from the enclosure into any one of said compartments, means for automatically closing any one of the compartments upon the entrance of an animal thereinto, and animal caging means within the enclosure designed to permit the animal to escape therefrom into the enclosure, each of said compartments when closed restraining the animal after the compartment is removed from its position adjacent the floor.

7. A game structure of the character described, comprising a floor, enclosure forming means upon the floor, a plurality of open chambers outside of said enclosure, means facilitating the passage of an animal from within the enclosure into any one of the chambers, an animal trapping box removably disposed in each chamber and having an entrance associated with the said means, means operating automatically by the entrance of an animal into the box to close the box against the animal's escape, and animal caging means within the enclosure designed to permit the animal to escape therefrom into the enclosure.

8. A game structure of the character described, comprising a floor, enclosure forming means upon the floor, a plurality of open chambers outside of said enclosure, means facilitating the passage of an animal from within the enclosure into any one of the chambers, means in each chamber for trapping an animal entering the same from the enclosure, an animal cage suspended in and adapted to rest upon the floor within the enclosure and having an open bottom, and means for raising the cage to a suspended position above the floor for the escape of a caged animal.

9. A game structure of the character described, comprising an enclosed play area, a plurality of animal entrapping units arranged outside said area, means whereby a free animal in the play area may enter any one of said units, a vertical standard in said area, a cage attached to the standard for sliding movement thereon and having an open bottom adapted to rest on the play area, means securing the cage on said area and means operating upon release of the securing means to slide said cage up on the standard to permit an animal to escape therefrom into said area.

JACK PAUL.